United States Patent [19]

Boudreau

[11] Patent Number: 5,004,216
[45] Date of Patent: Apr. 2, 1991

[54] SPRING CONNECTION ASSEMBLY

[75] Inventor: Robert J. Boudreau, Bedford, Pa.

[73] Assignee: Hedstrom Corp., Bedford, Pa.

[21] Appl. No.: 461,229

[22] Filed: Jan. 5, 1990

[51] Int. Cl.⁵ .................... F16F 01/12; A63G 17/00
[52] U.S. Cl. ............................... 267/179; 272/52
[58] Field of Search ................ 272/52; 267/73, 74, 267/166, 179, 286, 170; 24/300, 301, 601.8, 601.9, 698.3

[56]  References Cited
U.S. PATENT DOCUMENTS

| 405,798 | 6/1889 | Price | 267/74 |
|---|---|---|---|
| 1,907,529 | 5/1933 | Faure-Roux | 24/300 X |
| 2,924,448 | 2/1960 | Nantz | 272/52 |
| 2,978,245 | 4/1961 | Rempel | 272/52 |
| 3,132,860 | 5/1964 | Nantz | 272/52 |
| 3,174,787 | 3/1965 | Kolman | 24/300 X |
| 3,495,794 | 2/1970 | Polk | 272/52 X |
| 4,076,433 | 2/1978 | Halopoff | 267/74 X |

FOREIGN PATENT DOCUMENTS

| 594835 | 3/1960 | Canada | 272/52 |
|---|---|---|---|
| 596244 | 4/1960 | Canada | 272/52 |
| 1026821 | 4/1966 | United Kingdom | 272/52 |

Primary Examiner—Robert J. Oberleitner
Assistant Examiner—Alfred Muratori
Attorney, Agent, or Firm—Cesari and McKenna

[57] ABSTRACT

A spring connection assembly for a bouncing toy to connect a seating platform to a support includes an elongated support member, an eyelet mounted to the support member for rotation about the member axis, a coil spring having an end hook hooked through the eyelet and a clip having a clip portion extending parallel to the spring hook but in the opposite direction and a base portion retained within the end of the spring.

8 Claims, 1 Drawing Sheet

SPRING CONNECTION ASSEMBLY

This invention relates to children's bouncers and similar spring-mounted toys. It relates more particularly to a spring connection assembly for use on such toys.

BACKGROUND OF THE INVENTION

A spring-mounted toy such as a bouncer comprises a seating platform suspended from a support by means of springs. The seating platform may have the form of a horse or other animal which can be straddled by the child. The support is usually designed to rest on the floor or other horizontal surface. Springs are stretched between the front and rear of the seating platform and raised posts or standards on the support so that the seating platform is suspended more or less horizontally above the floor or other horizontal surface at a height such that a child can climb onto and sit on the seating platform and by shifting his or her weight, jounce and bounce as if he were on a bucking horse, for example.

The springs which connect the seating platform to the support have hooks at their opposite ends and usually these hooks hook into eyes mounted to the support and to laterally projecting struts on the seating platform. While the prior spring connections resiliently support the seating platform, they do have some disadvantages. More particularly, all of the springs on a given bouncer toy are not always hooked in the same way between the seating platform and the support. That is, the connections of one spring may be more resistant to pivotal or swinging motion than those of the other springs so that the seating platform has a bouncing motion which is uneven and jerky.

The differences in the actions of the spring connections are due in large part to the design of the spring connections themselves. A typical spring used in this application is a coil spring having an elongated barrel or tubular shape. The two endmost turns of the spring are bent out more or less parallel to the axis of the spring to form integral hooks. However, those hooks may be oriented in various different angles about the spring axis. For example, if the hook at one end of the spring lies in a horizontal plane, the hook at the opposite end of that spring may lie in a horizontal plane, vertical plane or repose at some intermediate angle. Therefore, when hooking the opposite ends of that spring to the eyes on a seating platform and its support, the swiveling motion of the hooks relative to those eyes may differ depending upon the angles at which the hooks hook through the corresponding eyes.

Bear in mind also that the eyes themselves are usually formed by closed hooks having threaded shanks which are bolted to their supporting structures so that those eyes are often free to pivot about their axes further complicating the angular relationships between the spring hooks and the eyes to which they are engaged. The upshot is that when the child bounces up and down on the toy, the hook-eye connections bind to greater or lesser degrees depending upon the angles at which the hooks intercept their corresponding eyes, resulting in less than optimum motion of the seating platform as noted above.

Another disadvantage of the prior spring connections for such toys is that if a child bounces vigorously enough and in a certain way, one or another of the springs may twist about its axis to such an extent that one or both of its hooks can become detached from its corresponding eye so that the seating platform is no longer supported in a stable condition. In other words, the platform may tip to such an extent that the child thereon may fall off. This condition obviously increases the potential for injury to the child.

SUMMARY OF THE INVENTION

The present invention aims to provide a spring connection assembly for a child's ride-on toy such as a bouncer or spring horse which enhances the ridability of the toy. Thus, it is an object of the invention to provide such a spring connection assembly which enables all of the assemblies supporting a toy seating platform to pivot and swing in more or less the same way to provide a balanced and even ride.

Another object is to provide such an assembly which minimizes the likelihood of detachment of the toy's seating platform from its support.

Other objects will, in part, be obvious and will, in part, appear hereinafter. The invention accordingly comprises the features of construction, combination of elements and arrangement of parts which will be exemplified in the following detailed description, and the scope of the invention will be indicated in the claims.

The present invention will be described in the context of a child's ride-on bouncing toy in the form of a spring horse. It should be understood, however, that the invention has equal application to other spring-supported toys.

The toy includes an upstanding support and a simulated horse suspended fore and aft from the support by pairs of spring assemblies stretched between the support and a pair of laterally extending posts or struts projecting from the sides of the horse. Each assembly includes a barrel-shaped coil spring whose outboard end is hooked in a conventional way to an eye mounted to the support. However, the hook at the inboard end of each spring is hooked to a special bracket swivelingly engaged to the adjacent post projecting from the side of the horse. Each bracket forms an eye which lies in a plane parallel to the post and, as noted above, the bracket can pivot or swivel about the post axis so that the inboard end of the spring connected thereto can swing freely about the post axis no matter how the spring is hooked to the bracket or to the support. Since the inboard ends of all of the springs supporting the horse are permitted to swing to the same extent relative to the projecting post to which they are connected, the bouncing motion of the horse is much more uniform than is the case with the conventional spring-supported bouncing toys described at the outset.

Also included at the inboard end of each spring is a special safety clip which plugs into the end of the spring coil. The clip includes a hook which projects from the end of the coil which is arranged to hook onto the bracket in the opposite direction from the hook formed at that end of the spring. In other words, the spring hook and the clip hook together form a closed ring which prevents the inboard end of that spring from becoming detached from its bracket no matter how vigorously the horse may be bounced by a child thereon.

Thus, the providing of a spring connection assembly which includes a swiveling bracket enhances the motion of the seat component of the bouncing toy and provides a more natural ride, while at the same time, making the toy safer to use. Yet these advantages are provided without appreciably increasing the overall cost of the toy or making it more difficult for the toy to be assembled by the average purchaser.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENT

Figure 1:
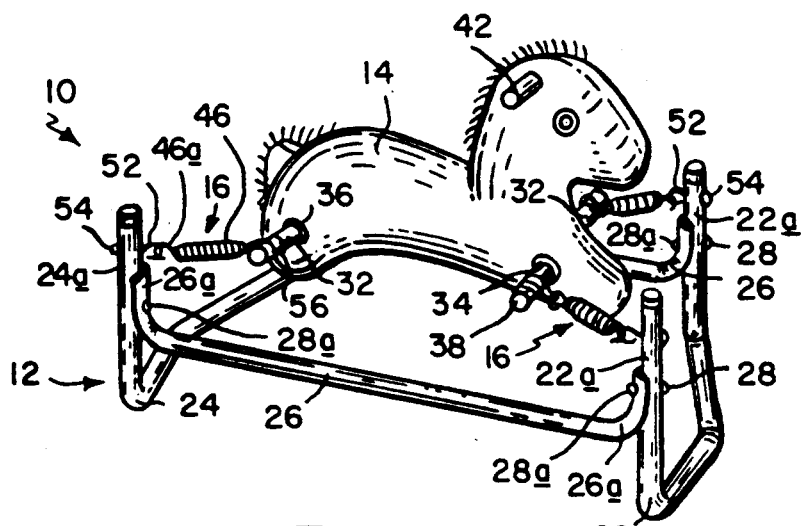
FIG. 1 is an isometric view of a ride-on toy incorporating my spring connection assembly.

FIG. 1 of the drawing shows a child's toy, namely a bouncer 10, which includes a support 12 and a simulated horse 14. The horse is suspended from the support 12 by means of four spring connection assemblies incorporating my invention and shown generally at 16, there being two such assemblies supporting the forward end of the horse and two supporting the rear end of the horse. Support 12 includes fore and aft U-frames 22 and 24 with upstanding legs 22a and 24a, respectively. The two U-frames are held in spaced-apart relation by a pair of side frames 26, each such frame having upturned ends 26a which are flattened and secured to corresponding legs 22a, 24a of U-frames 22, 24 by appropriate bolts 28. Bolts 28 are inserted through registering holes (not shown) in frame ends 26a and legs 22a, 24a and held in place by appropriate nuts 28a threaded onto the protruding ends of the bolts. The U-frames 22 and 24 of the support are arranged to rest on the floor or other horizontal surface so as to support the horse 14 more or less horizontally as shown in FIG. 1.

The horse 14 may be of any suitable design. For example, the horse may be composed of two molded plastic shells whose edges are bonded together to form a rigid hollow body which is painted to resemble a horse. A pair of posts 32 extend through holes 34 formed adjacent to the forward and rear ends of the horse 14 so that the opposite ends of the posts project laterally from the sides of the horse. The posts are axially fixed to the horse by suitable means such as collars 36 slid onto the ends of the posts 32 and secured there by suitable fastener means (not shown). Plastic caps 38 may be fitted onto the ends of the posts to finish those ends and to cover any sharp edges there. The forward posts 32, in addition to providing connection points for the forward spring assemblies 16, also provide supporting surfaces or "stirrups" for the feet of a child sitting on the horse 14. A shorter post 42 inserted through holes in the side of the horse's head is retained there as described above for posts 32 to provide handles or "ears" which the child can grip while riding the toy.

A child uses the toy by straddling the horse and shifting his or her weight to cause the horse to bounce up and down and swing to and fro resulting in a variable pivoting and stretching of each of the various spring connection assemblies 16. By pulling up and back on the gripping post 42 and pushing down and forward on the front or stirrup post 32, the rider can produce a variety of different bouncing, bucking and swaying movements of the horse.

Figures 2, 3, 4:
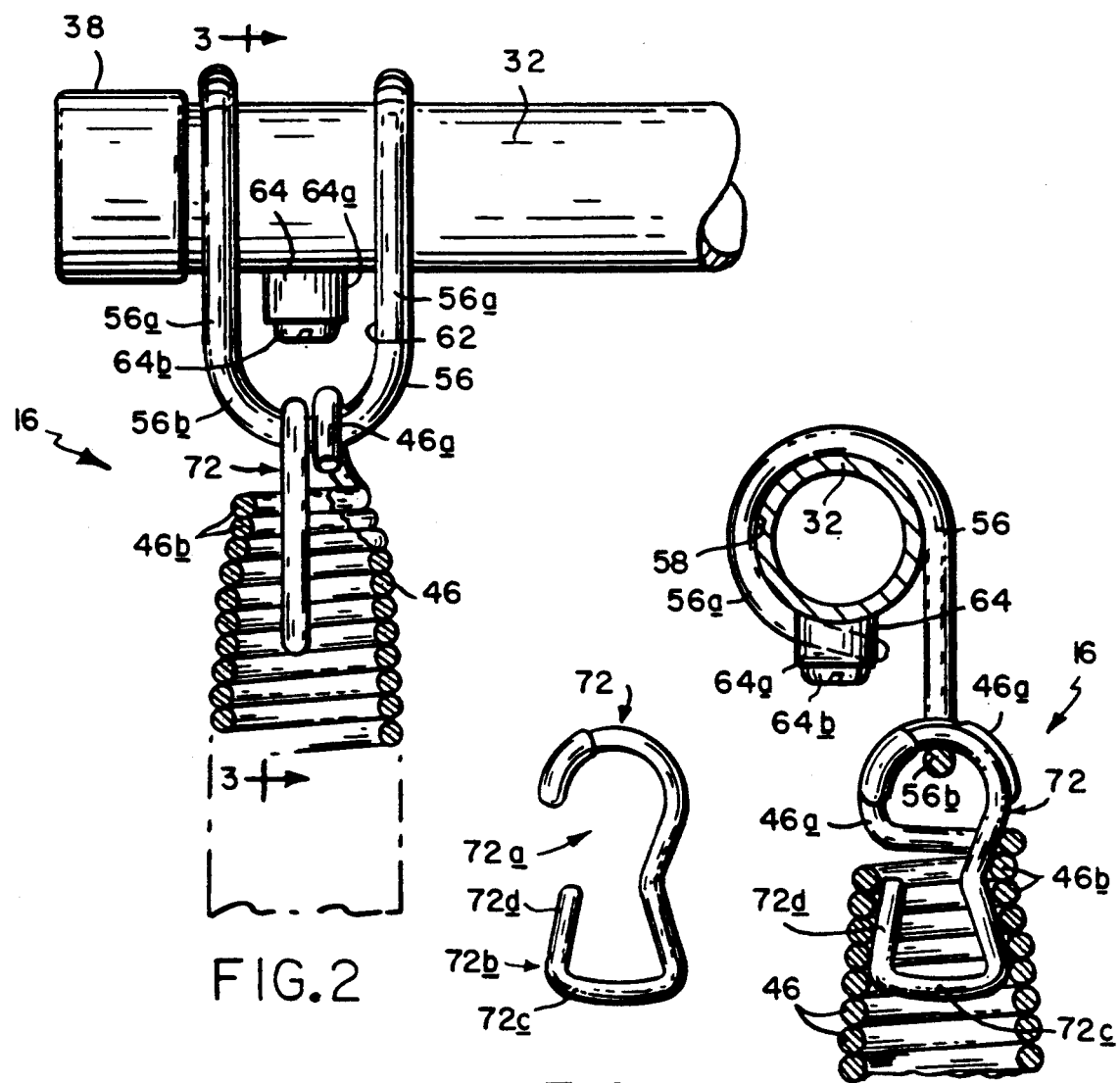
FIG. 2 is a fragmentary plan view on a much larger scale showing the elements of the FIG. 1 assembly in greater detail.
FIG. 3 is a sectional view taken along line 3—3 of FIG. 2.
FIG. 4 is an elevational view showing an element of the assembly in greater detail.

Referring now to FIGS. 2 and 3, each spring connection assembly 16 includes a tightly coiled spring 46 having a tubular or barrel shape. The endmost turns of the tubular coil are bent out to form integral hooks 46a each of which lies in a plane which is more or less perpendicular to the end of the coil per se, (i.e., parallel to the coil axis). The two hooks 46a of each coil may have the same or different angular orientations about the axis of spring 46.

As shown in FIG. 1, the hook 46a at the outboard end of each spring 46 hooks through the eye of an eyelet fastener 52 whose threaded shank extends through appropriate holes in support legs 22a or 24a and is retained there by a nut 54 threaded onto the projecting end of the fastener 52.

Referring again to FIGS. 2 and 3, each assembly 16 also includes a rigid wire bracket 56. Bracket 56 is formed as a U with long legs 56a. The end segments of those legs are turned back on themselves to form circular loops 58 whose inner diameters are slightly larger than the outer diameter of each post 32. Prior to installing the end caps 38 on the opposite ends of each post 32, a pair of brackets 56 is slid onto the ends of each post so that the post is fairly loosely received in the bracket loops 58. When installed thusly on the post, the bracket closed end or bight 56b forms an eye 62 which extends out tangentially or at right angles to the corresponding post 32. Since the bracket leg segments forming loops 58 are loosely wrapped around the post, the bracket is free to swivel or swing about the post axis.

The position of each bracket 56 along the post is more or less fixed by a stop member 64 projecting laterally from post 32 between the leg segments 56a of each bracket 56. In the illustrated toy 10, each stop member 64 comprises a plastic sleeve 64a which is held in place against the post by a sheet metal screw 64b threaded through the post wall. Thus, each bracket 56 is retained adjacent to the end of a post 32, but is free to swivel about the post axis.

Referring now to FIGS. 2 to 4, the final component of assembly 16 is a rigid wire clip 72. Each clip 72 includes a hook portion 72a which has more or less the same shape as the hooks 46a on the ends of springs 46 and a base portion 72b which is more or less U-shaped but with the legs of the U being bent toward one another as best seen in FIG. 4. The clip base portion 72b has a bottom stretch 72c which is longer than the inner diameters of the endmost complete coils 46b of the barrel-shaped springs 46. However, the free end segment 72d of the clip base portion 72b is shorter than the inner diameters of those endmost spring coils 46b. This permits the base portion 72b of each clip 72 to be inserted sideways, i.e. segment 72d first, into the end of a spring 46. This clip geometry allows the clip to be straightened up as shown in FIG. 3. When a tensile force is applied to the clip, the clip base portion 72b, being wider at its bottom than the inner diameters of the adjacent endmost spring coils 46b, will wedge against those coils and retain the clip in place within the end of the coil.

Prior to attaching the outer hook of each spring 46 to support 12, the inner spring hook and the associated clip hook 72 are attached to bracket 56. This is accomplished by hooking the hook portion 72a of clip 72 through the bracket eye 62 and then inserting the base portion 72b of that clip sideways into the end of spring 56 far enough so that the clip can be swung up perpendicular to the end of the spring as described above. Now the clip hook 72a projects out from the end of the spring coil with the clip hook 72a extending in the opposite direction from the spring hook 46a. At this point, the spring hook 46a is not yet hooked through the bracket eye 62. Next, the bracket 56 is swung under the end of the spring hook 46a so that the spring hook also engages the bracket bight 56b as shown in FIGS. 2 and 3. Now the two hooks 46a and 72a form a closed loop which completely encircles the bracket and prevents the spring from becoming disconnected from the bracket even if the horse 14 is bounced violently when the toy 10 is in use.

Once the inner hooks of all of the springs 46 are connected thusly to the corresponding brackets 56, the outer hooks on those springs may be hooked in the usual way to the eyelet fasteners 52 on the various legs of support 12. When properly connected, the springs 46 at the front end of the horse splay out toward the legs of frame 22, and those at the rear end of the horse splay out toward the rear legs of frame 24 so that the horse 14, when at rest, is resiliently supported generally horizontally as shown in FIG. 1.

It will be appreciated from the foregoing that the spring connection assemblies 16 that support horse 14 improve the performance of toy 10 by providing a more consistent bouncing action. Also, the assemblies minimize, if not completely eliminate, the possibility of the horse 14 becoming even partially disconnected from its support. Therefore, the assemblies also improve the toy from a safety standpoint. Both of these factors should greatly increase the marketability of the toy.

It will thus be seen that the objects set forth above, among those made apparent from the preceding description, are efficiently attained. Also, since certain changes may be made in the above construction without departing from the scope of the invention, it is intended that all matter contained in the above description or shown in the accompanying drawing be interpreted as illustrative and not in a limiting sense.

It should also be understood that the following claims are intended to cover all of the generic and specific features of the invention herein described.

I claim :

1. A spring connection assembly for use in a bouncing toy to connect a seating platform to a support therefor, said assembly including an elongated support member having a longitudinal axis;

eyelet means rotatably mounted to said support member for free rotation about said member axis;

a coil spring having two ends and an integral spring hook at one end thereof, said hook being hooked to said eyelet means; and clip means secured to said spring one end, said clip means including a hook portion extending generally parallel to said spring hook, said hook portion being hooked through said eyelet means in the opposite sense from said spring hook.

2. The assembly defined in claim 1 wherein said eyelet means comprises a rigid U shaped wire member having a closed end and legs loosely wrapped around said support member so that said closed end extends out tangentially from said support member to form an eye.

3. The assembly defined in claim 2 and further including stop means secured to said support member between said wire member legs for limiting movements of said wire member along said support member.

4. The assembly defined in claim 3 and further including a second integral hook at the other end of said coil.

5. The assembly defined in claim 1 wherein said spring one end has at least one coil whose inner diameter is smaller than those of the coils further along said spring; and said clip means also includes a base portion having a maximum width which is larger than said diameter of said at least one coil but smaller than the diameters of said coils further along said spring.

6. The assembly defined in claim 5 wherein said clip means, hook portion and base portion are formed as a rigid open wire loop, said base portion having a bottom segment which defines the maximum width of said base portion and a pair of upwardly inwardly extending side segments, one of said side segments being connected to said hook portion, the other of said side segments having a free end, the length of said other segment being less than the inner diameter of said at least one spring coil thereby enabling said base portion to be inserted sideways into said spring one end and tilted upright so that said hook portion projects from said spring one end and said base portion wedges against said at least one spring coil to prevent said clip means from being pulled out of said spring one end when a tensile force in applied to said clip means.

7. The assembly defined in claim 6 and further including a second integral spring hook formed at the other end of said spring.

8. The assembly defined in claim 7 and further including a seating platform;

means for securing said support member to said seating platform so that said support member projects from said seating platform; and support means including an eyelet, said second spring hook being hooked to said support means eyelet.

* * * * *